US008265903B2

(12) United States Patent
Chu et al.

(10) Patent No.: US 8,265,903 B2
(45) Date of Patent: Sep. 11, 2012

(54) METHOD FOR ASSESSING DATA WORTH FOR ANALYZING YIELD RATE

(75) Inventors: Yij Chieh Chu, Sanchong (TW); Chun Chi Chen, Taipei (TW); Yun-Zong Tian, Shihgang township, Taichung County (TW); Shih Chang Kao, Kaohsiung (TW); Cheng-Hao Chen, Taipei (TW)

(73) Assignee: Inotera Memories, Inc., Taoyuan County (TW)

( * ) Notice: Subject to any disclaimer, the term of this patent is extended or adjusted under 35 U.S.C. 154(b) by 584 days.

(21) Appl. No.: 12/458,302

(22) Filed: Jul. 8, 2009

(65) Prior Publication Data
US 2010/0268501 A1 Oct. 21, 2010

(30) Foreign Application Priority Data
Apr. 15, 2009 (TW) ................ 98112470 A

(51) Int. Cl.
*G06F 17/16* (2006.01)
(52) U.S. Cl. ....................................................... 702/179
(58) Field of Classification Search .................. 702/81, 702/82, 84, 90, 118, 146, 176, 179, 182, 702/183, 196
See application file for complete search history.

(56) References Cited

U.S. PATENT DOCUMENTS 6,975,953 B2 * 12/2005 Kadota ..................... 702/117
7,369,908 B2 * 5/2008 Ono et al. ................. 700/97

* cited by examiner

*Primary Examiner* — Mohamed Charioui
(74) *Attorney, Agent, or Firm* — Rosenberg, Klein & Lee

(57) ABSTRACT

A method for assessing data worth for analyzing yield rate includes: getting measured data with data points that corresponds to control variables of semiconductor manufacturing; transforming the data points into a distance matrix with matrix distances corresponding to differences of the data points under the control variables; expressing sample differences recorded in the distance matrix by two-dimension vectors and calculating similarity degrees of the two-dimension vectors and the distance matrix so as to take loss information as a conversion error value; calculating discriminant ability of the transformed two-dimension data and expressing the discriminant ability by an error rate of discriminant; and taking the conversion error value and the error rate of discriminant as penalty terms and calculating a quality score corresponding to the measured data. Thereby, before analyzing the yield rate of semiconductor manufacturing, analysts can determine whether data includes information affecting the yield rate based on the quality score.

7 Claims, 7 Drawing Sheets

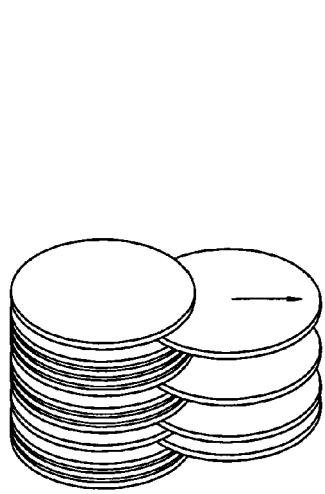
FIG. 2A
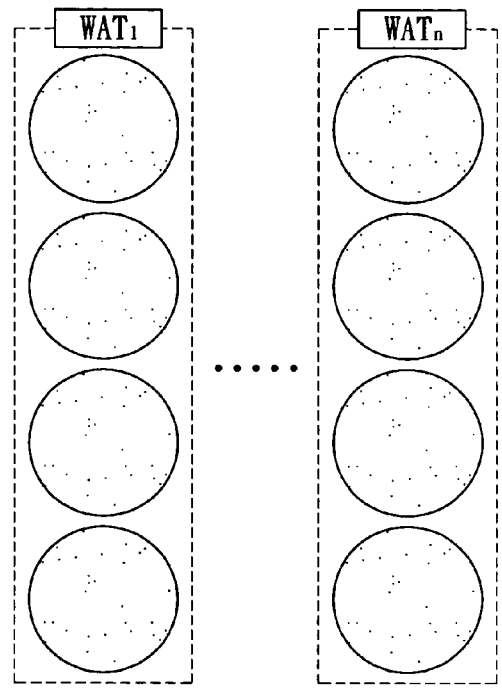
FIG. 2B
| | control variable a | control variable b | control variable c | control variable d | yield rate |
|---|---|---|---|---|---|
| wafer A | 110 | 6 | 2 | 290 | good product |
| wafer B | 110 | 2 | 1 | 250 | good product |
| wafer C | 110 | 2 | 1 | 260 | good product |
| wafer D | 120 | 1 | 3 | 210 | defective product |
FIG. 2C

|  | data point A | data point B | data point C | data point D |
|---|---|---|---|---|
| data point A | 0 | 40.21 | 30.28 | 80.78 |
| data point B | 40.21 | 0 | 10 | 41.29 |
| data point C | 30.28 | 10 | 0 | 51.04 |
| data point D | 80.78 | 41.29 | 51.04 | 0 |

METHOD FOR ASSESSING DATA WORTH FOR ANALYZING YIELD RATE

BACKGROUND OF THE INVENTION

1. Field of the Invention

The present invention relates to a method for assessing data worth for analyzing yield rate, and more particularly to a method for processing measured data corresponding to semiconductor manufacturing and assessing data worth for analyzing yield rate.

2. Description of Related Art

For controlling stable manufacturing and production quality, semiconductor manufacturers always record related production information during manufacturing. Since semiconductor manufacture is very complicated and production ability always needs to be maximized, the amount of recorded data is quite large. Once abnormal conditions occur, analysts must firstly determine control factors, time ranges, and data units for test when they want to select factors affecting changes of yield rate from huge databases.

The selection of control variables has a great influence on analysis results. Whether effective analysis results can be obtained depends on whether or not data sets for analysis include information regarding changing factors affecting yield rate. Because there are a lot of control variables, composite factors affecting changes of yield rate usually cannot be picked out totally based on analysts' experience. Furthermore, if the selection of data units causes information loss (for example, average values cannot reflect changes of average data), data sets for analysis do not include information about changing factors affecting yield rate. Accordingly, if the validity of data sets is not judged firstly, then the reliability of analysis results cannot be measured.

Hence, the inventors of the present invention believe that the shortcomings described above are able to be improved and finally suggest the present invention which is of a reasonable design and is an effective improvement based on deep research and thought.

SUMMARY OF THE INVENTION

An object of the present invention is to provide a method for assessing data worth for analyzing yield rate, which calculates the measured data by a descending dimension algorithm so as to divide data with different similarity degrees into groups. Before analyzing the yield rate of semiconductor manufacturing, analysts judge whether or not data includes information that has an influence on the yield rate and has significances is based on the conditions of divided data groups, so that the analysts can recognize the reliability of the measured data.

To achieve the above-mentioned object, a method for assessing data worth for analyzing yield rate in accordance with the present invention is provided. The method includes the steps of: getting measured data with a plurality of data points, the plurality of data points corresponding to a plurality of control variables of semiconductor manufacturing; transforming the plurality of data points into a distance matrix with matrix distances, the matrix distances corresponding to differences of the plurality of data points under the plurality of control variables; expressing sample differences recorded in the distance matrix by two-dimension vectors and calculating similarity degrees of the two-dimension vectors and the distance matrix so as to take loss information as a conversion error value; calculating discriminant ability of the transformed two-dimension data and expressing the discriminant ability by an error rate of discriminant; and taking the conversion error value and the error rate of discriminant as penalty terms and calculating a quality score corresponding to the measured data.

The efficacy of the present invention is as follows: based on the calculation of the quality score, the present invention can determine whether or not the measured data include information that has an influence on the yield rate and has significances, and thereby provide analysts with proper information for analyzing and recognizing the reliability of the information.

To further understand features and technical contents of the present invention, please refer to the following detailed description and drawings related the present invention. However, the drawings are only to be used as references and explanations, not to limit the present invention.

BRIEF DESCRIPTION OF THE DRAWINGS

FIG. 2A-2C is a schematic view of measured data of the present invention;

DETAILED DESCRIPTION OF THE PREFERRED EMBODIMENTS

Figure 1:
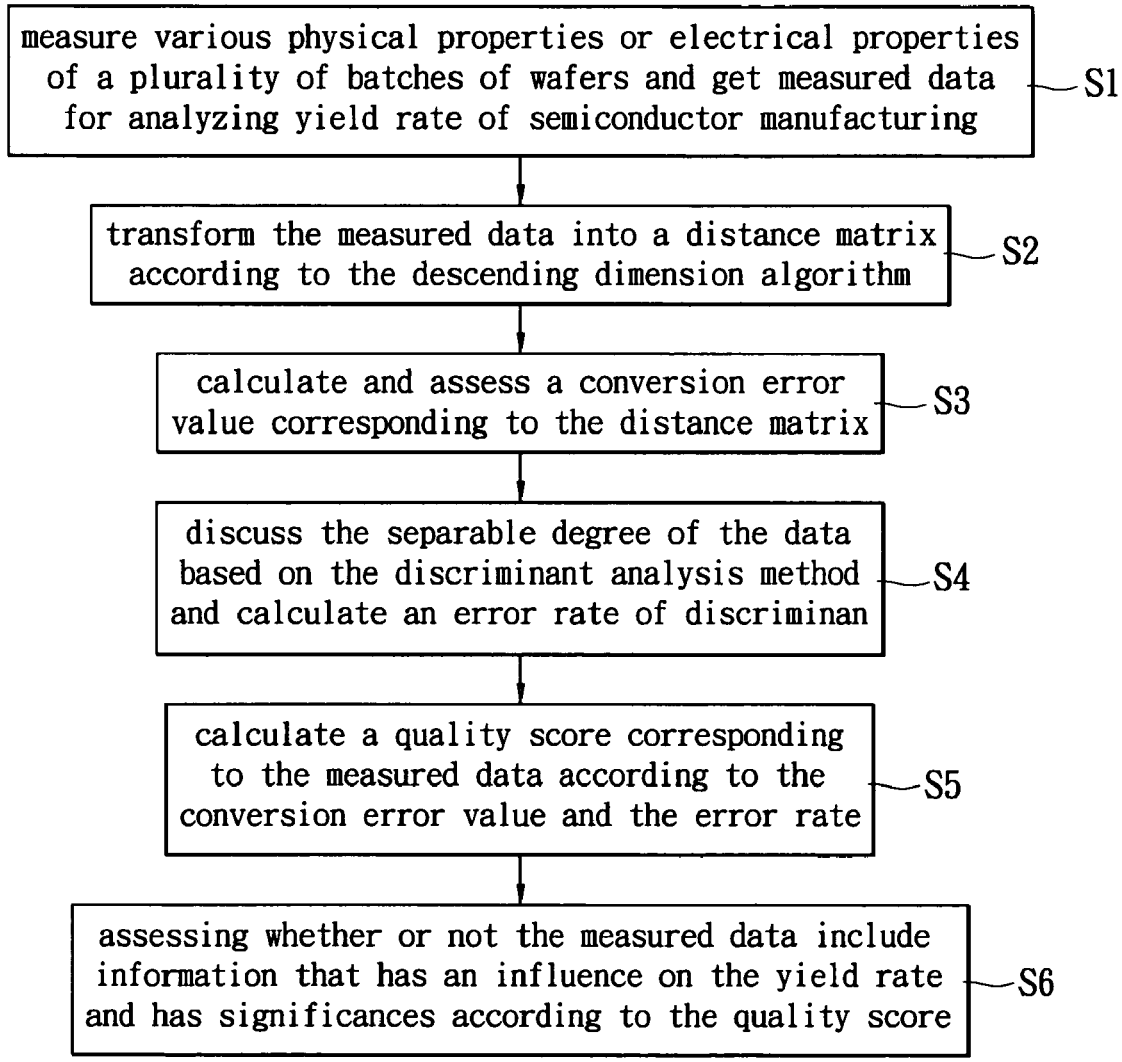
FIG. 1 is a flow chart of a method for assessing data worth for analyzing yield rate of the present invention.

Please refer to FIG. 1, a method for assessing data worth for analyzing yield rate in accordance with the present invention includes the steps as follows.

Step S1, measure various physical properties or electrical properties of a plurality of batches of wafers and get measured data for analyzing yield rate of semiconductor manufacture. Please refer to FIGS. 2A-2C.

For controlling stable manufacturing and production quality, semiconductor manufacturers record related production information during manufacturing. Taking wafer acceptance test (WAT) information for examples, analysts randomly sample a plurality of pieces of wafers from each batch of wafers as objects to be measured and recorded for measuring and recording various electrical properties and yield rate of the wafers (as shown in FIG. 2B, WAT1-WATn show n kinds of electrical characteristics of the measured wafers). The recording form is shown in FIG. 2C, and for convenient description, the present embodiment takes four pieces of wafers for examples (which are respectively the wafer A, the wafer B, the wafer C, and the wafer D), to measure electrical properties of the four pieces of wafers, corresponding to four kinds of control variables of semiconductor manufacture, (that is, the numerical values in FIG. 2C, such as 110, 6, 2, or 290), and find the records which show whether or not the wafers are good products, wherein the electrical properties may be used to express physical characteristics of component specifications of the wafers. At this time, the specification differences between good products and defective products may be traced based on the control variable a, the control variable b, the control variable c, and the control variable d, so as to judge whether or not a certain manufacture difference causes changes of the yield rate of the wafers. However, the measured data in practical applications are much larger than those in the present embodiment and are a multi-dimension matrix which has a plurality of data points, wherein the number of the data points corresponding to the number of the measured wafers, and each data point is a multi-dimension vector with the plurality of control variables corresponding to the electrical properties of the measured wafers. For example, $X=[x_1 \ x_2 \ldots x_p]$, wherein $x_i=[x_{i1} \ x_{i2} \ldots x_{in}]'$, and X expresses a data matrix of n×p and records p kinds of physical properties or electrical properties of n data points. Accordingly, the measured data include multi-dimension parameters.

Figures 3A, 3B:
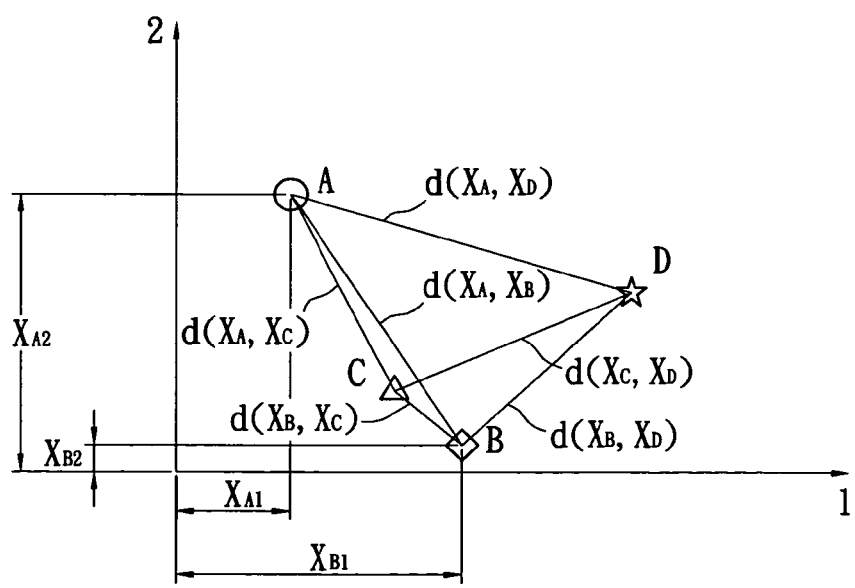
FIG. 3A is a schematic view of a distance matrix of the present invention.
FIG. 3B is a schematic view of a characteristic pattern of the present invention.

Step S2, transform the measured data into a distance matrix according to the descending dimension algorithm. Based on calculating Euclidean distance of each data point (data points A-D) in the step S1 (as shown in FIG. 3A), relative differences of each data point are assessed. Furthermore, the measured data in the step S1 are transformed into two-dimension data based on Euclidean distances by the multi-scale analysis method (as shown in FIG. 3B). In other words, the measured data in the step S1 include multi-dimension parameters which establish spatial point distribution in the Euclidean coordinate system for expressing the distances between the plurality of data points. The measured data are transformed into the distance matrix which is a two-dimension matrix, wherein the data points are expressed as multi-dimension vectors and the distance matrix may be mapped into a two-dimension coordinate system to form a characteristic graph, so one data point may be regarded as one point of the characteristic graph, a plurality of data points establish data distribution in the characteristic graph, and the data with the same similarity degree aggregate together in the characteristic graph, so that the plurality of data points (such as data points A-D) are distributed in the characteristic graph, and the data points with different similarity degrees are divided into different groups. Please refer to FIGS. 3A-3B, the distance matrix has four data points (data points A-D), and each data point has a plurality of matrix distances (that is, the numerical values in FIG. 3A, such as 0, 40.21, 30.28, or 80.78), for recording the distance between the data point and the other data points. The data points are mapped into the characteristic graph (please refer to FIG. 3B, A-D respectively express data points A-D) to establish data distribution in the two-dimension space, so that the distances between any two points are equal (such as $d(x_A, x_B)$, $d(x_A, x_C)$, $d(x_A, x_D)$, $d(x_B, x_C)$, $d(x_B, x_D)$, or $d(x_C, x_D)$). In terms of mathematics, the distance between the data point A and the data point B is expressed as: $d(x_A, x_B)=(x_{A1}-x_{B1})^2+(x_{A2}-x_{B2})^2$; wherein $x_{A1}$ and $x_{A2}$ respectively express the projection component of the data point A on the horizontal axis (1) and the projection component of the data point A on the vertical axis (2) in the two-dimension space, and $x_{B1}$ and $x_{B2}$ respectively express the horizontal projection component and the vertical projection component of the data point B in the two-dimension space. However, while the calculation formula for the distance d of the present invention is Squared Euclidean Distance Formula, the calculation formula for the distance d may also be other formulas with the same effect, such as City-Block Distance Formula for calculating the distance between any two data points of the plurality of data points.

Figure 4A:
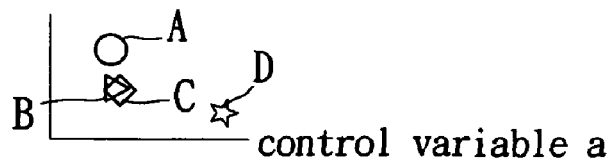
FIG. 4A is a distribution graph of measured data projected on a coordinate plane of control variables a-b of the present invention, before transforming.
Figure 4B:
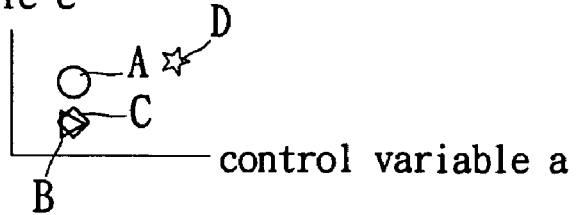
FIG. 4B is a distribution graph of measured data projected on a coordinate plane of control variables a-c of the present invention, before transforming.
Figure 4C:
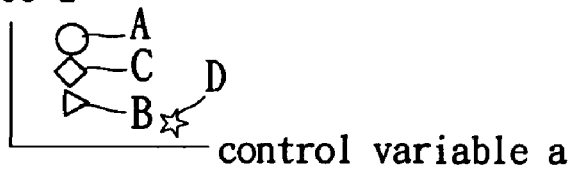
FIG. 4C is a distribution graph of measured data projected on a coordinate plane of control variables a-d of the present invention, before transforming.
Figure 4D:
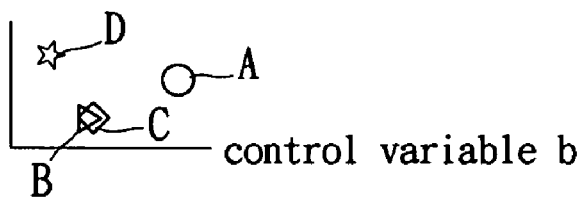
FIG. 4D is a distribution graph of measured data projected on a coordinate plane of control variables b-c of the present invention, before transforming.
Figure 4E:
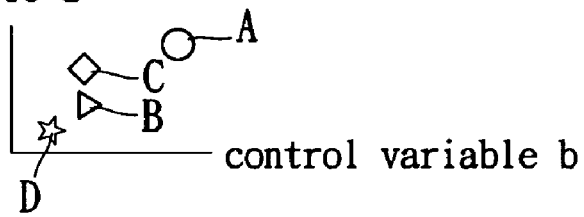
FIG. 4E is a distribution graph of measured data projected on a coordinate plane of control variables b-d of the present invention, before transforming.
Figure 4F:
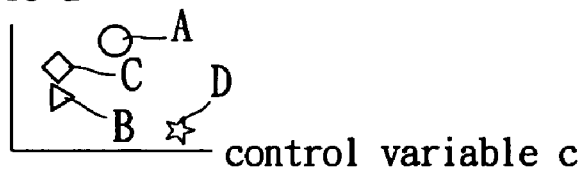
FIG. 4F is a distribution graph of measured data projected on a coordinate plane of control variables c-d of the present invention, before transforming.

Step S3, calculate and assess a conversion error value corresponding to the distance matrix and judge whether or not relative differences of each data point in the two-dimension space are similar to that in the original multi-dimension space. The nearer the matrix distance ratio of each data point in FIG. 3A approaches the distance ratio of each data point in FIG. 3B, the lower the distortion degree of the transforming is. For further description, please refer to FIGS. 4A-4F, two-dimension planar view is used to show the differences of data points of the original multi-dimension data. As described in the step S1 and the step S2, the measured data have four data points (data points A-D) and the data points respectively have four control variables (the control variables a-d). The data points establish spatial point distribution in the Euclidean coordinate system (three of the four control variables may form the Euclidean coordinate system) for expressing the distances between the data points. However, the spatial point distribution may be mapped into the coordinate planes formed by each two coordinate axes in the Euclidean coordinate system, for example, the coordinate plane formed by the control variable a and the control variable b (as shown in FIG. 4A), the coordinate plane formed by the control variable a and the control variable c (as shown in FIG. 4B), the coordinate plane formed by the control variable a and the control variable d (as shown in FIG. 4C), the control variable b-control variable c coordinate plane (as shown in FIG. 4D), the coordinate plane formed by the control variable b and the control variable d (as shown in FIG. 4E), or the coordinate plane formed by the control variable c and the control variable d (as shown in FIG. 4F). The coordinate planes respectively correspond to the distribution of the corresponding data points (for example, A-D respectively express the data points A-D). The conversion error value may be expressed as $c=\Sigma_{i<k}\Sigma(d_{jk}-\hat{d}_{jk})^2/\Sigma_{i<k}\Sigma(d_{jk})^2$, wherein $i=1,2,\ldots N$, $k=1,2,\ldots N$, and $\hat{d}_{ik}$ denotes the monotonic function of the distance $d_{jk}$ between two data points of the distance matrix. If the arrangement order of the distances between N data points before the transforming (as shown in FIG. 4A-4F) is the same with that after the transforming (as shown in FIG. 3B), then $\hat{d}_{ik}=d_{ik}$; otherwise, the distances are replaced by the average value of the distances before the transforming and after the transforming.

Step S4, discuss the separable degree of the data based on the discriminant analysis method and calculate an error rate of discriminant. Since the calculation of the error rate of discriminant is well-known to those skilled in the art, so the detailed description thereof is omitted.

Step S5, calculate a quality score corresponding to the measured data according to the conversion error value and the error rate. The quality score is expressed as $Q=(1-C)\times(1-\epsilon)$, wherein $\epsilon$ denotes the error rate of discriminant, C denotes the conversion error value, $0<Q<1$. The nearer Q approaches 1, the greater the probability that the measured data includes information that has an influence on the yield rate and has significances. Accordingly, the control variables are the main factors affecting the yield rate.

Figure 5:
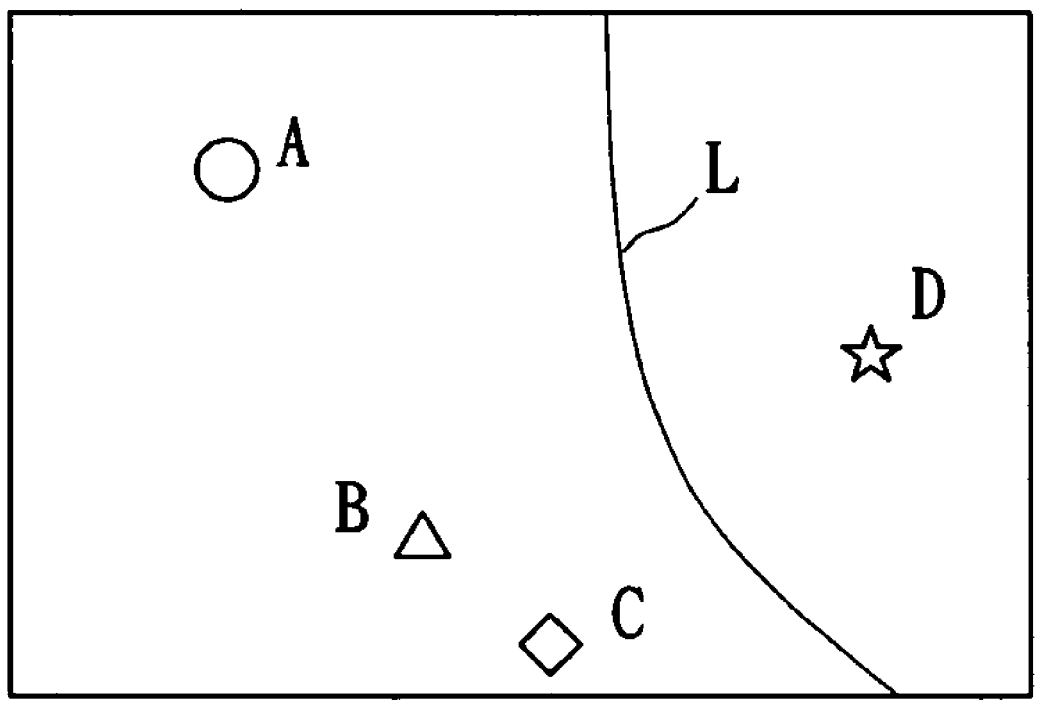
FIG. 5 is a schematic view of the relationship between the quality score and the data distribution of the present invention.
Figure 6A:
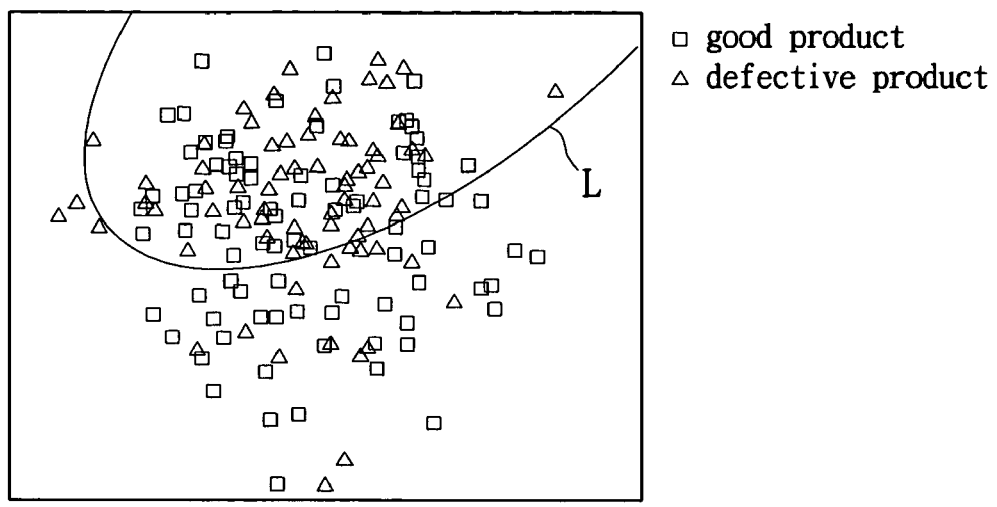
FIG. 6A is another schematic view of the relationship between the quality score and the data distribution of the present invention.
Figure 6B:
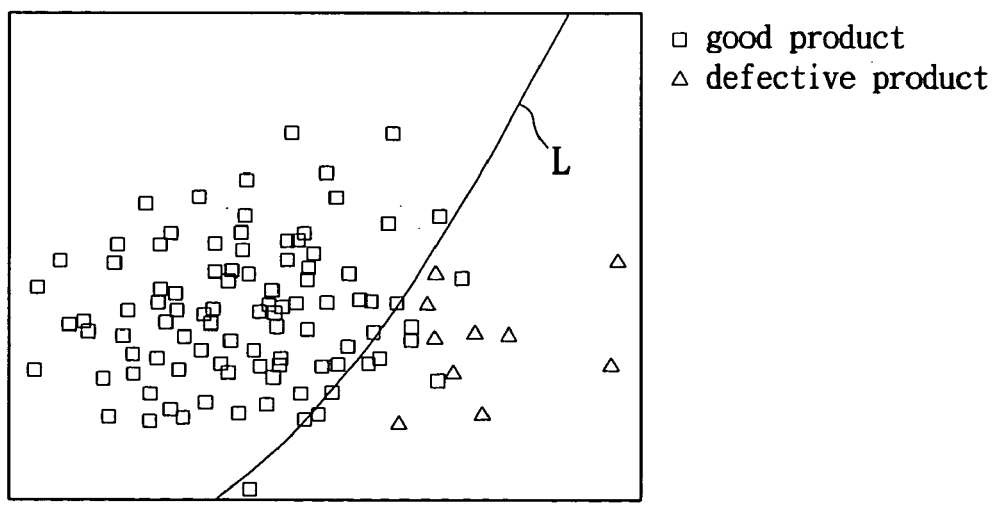
FIG. 6B is another schematic view of the relationship between the quality score and the data distribution of the present invention.

Step S6, assessing whether the measured data include information that has an influence on the yield rate and has significances according to the quality score. The quality score is used for assessing the distinguishability of the data points, and the higher quality score expresses that the data points are distinguishable under the control variables, and the measured data include information that has an influence on the yield rate and has significances. Please refer to FIG. 5, when the quality score Q approaches 1, the separated groups of the data points (such as A, B, C, and D) are distinguishable. A curve L divides the data points into two groups, one group includes A, B, and C, and the other group includes D. That is, the control variables a-d of the data points act as the main factors affecting the yield rate. Additionally, the measured data of the present invention further may include more data points. Please refer to FIG. 6A and FIG. 6B, the quality score Q approaches 0, the curve L cannot separate the data points obviously (as shown in FIG. 6A), at this time, the control variables cannot be the main factors for judging that the wafers are good products or defective products. So the probability that the measured data includes information that has an influence on the yield rate and has significances is lesser, and so that the control variables are not the main factors affecting the yield rate, thereby it needs to reselect different control variables. If the quality score Q is high, then the curve L can distinguish the good products and the defective products obviously (as shown in FIG. 6B), and the probability that the measured data includes information that has an influence on the yield rate and has significances is greater.

Accordingly, based on the calculation of the quality score Q, analysts can judge whether the measured data include information that have an influence on the yield rate or not before analyzing the yield rate of the semiconductor manufacturing. The nearer the quality score Q approaches 1, the greater the probability that the measured data includes information that has an influence on the yield rate and has significances, and the control variables are regarded as the main factors affecting the yield rate. When the quality score Q is low, it needs to re-collect the measured data and further select proper control variables so that the measured data have more significance, thereby providing analysts with proper information for analyzing and recognizing the reliability of the information.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A method for assessing data worth for analyzing a yield rate of wafers in a semiconductor manufacturing process based on a quality score, comprising the steps of:

measuring physical properties and electrical properties of the wafers, which are represented in terms of data points in a multi-dimension matrix, wherein each of the data points is a multi-dimension vector corresponding to a controlled factor;

transforming the plurality of the data points corresponding to the physical properties and the electrical properties of the wafers into a distance matrix with matrix distances, and the matrix distances representing differences of the plurality of the data points;

expressing the differences between the data points recorded in the distance matrix using two-dimension vectors and calculating similarity degrees of the two-dimension vectors and the distance matrix so as to retrieve loss information as a conversion error value corresponding to the distance matrix among the data points;

calculating discriminating ability of the transformed two-dimension vectors and expressing the discriminating ability by an error rate of a discriminate; and taking the conversion error value and the error rate of discriminant as penalty terms and calculating the quality score corresponding to the physical properties and the electrical properties of the wafers;

wherein the quality score is used for assessing distinguish-ability of the data points, with the higher quality score corresponding to the higher distinguish-ability of the data points under the controlled factors.

2. The method as claimed in claim 1, wherein the distance matrix is a two-dimension matrix.

3. The method as claimed in claim 2, wherein the matrix distances are equal to Euclidean distances between the plurality of the data points.

4. The method as claimed in claim 2, wherein the matrix distances are equal to City-Block Distances between the plurality of the data points.

5. The method as claimed in claim 1, wherein the conversion error value is expressed as $C=\Sigma_{i<k}\Sigma(d_{ik}-\hat{d}_{ik})^2/\Sigma_{i<k}\Sigma(d_{ik})^2$, wherein $i=1,2,\ldots N$, $k=1,2,\ldots N$, and $\hat{d}_{ik}$ denotes a monotonic function of the distance $d_{ik}$ between two data points of the distance matrix.

6. The method as claimed in claim 1, wherein the quality score is expressed as $Q=(1-C)\times(1-\epsilon)$, wherein $\epsilon$ denotes the error rate of the discriminate and C denotes the conversion error value.

7. The method as claimed in claim 6, wherein the quality score is between 0 and 1, and the closer the quality score Q approaches 1, the greater the probability that the measured physical properties and electrical properties are influential and significant on the yield rate and the closer the quality score Q approaches 0, the less the probability that the measured physical properties and electrical properties are influential and significant on the yield rate.

* * * * *